US00RE34368E

United States Patent [19]

Frain

[11] E Patent Number: Re. 34,368

[45] Reissued Date of Patent: Sep. 7, 1993

[54] METHOD OF PRODUCING STACKS OF TICKET STACKS

[75] Inventor: John J. Frain, Clearwater, Fla.

[73] Assignee: Arrow International, Inc., Brooklyn, Ohio

[21] Appl. No.: 791,492

[22] Filed: Nov. 12, 1991

Related U.S. Patent Documents

Reissue of:

[64] Patent No.: 4,448,127
Issued: May 15, 1984
Appl. No.: 382,950
Filed: May 28, 1982

[51] Int. Cl.[5] ..... B41F 13/54

[52] U.S. Cl. ..... 101/483; 270/1.1

[58] Field of Search ..... 101/93.01, 483, 72-79, 101/91; 270/1.1, 12-15, 18; 273/269, 270

[56] References Cited

U.S. PATENT DOCUMENTS 1,586,915 6/1926 Pendergast ..... 270/1.1
1,650,535 11/1927 Parsons ..... 270/1.1
3,421,752 1/1969 Folino ..... 270/1.1
3,822,876 7/1974 Frain ..... 270/1.1
3,998,446 12/1976 Dent ..... 270/18
4,368,665 1/1983 Boyle ..... 270/1.1

*Primary Examiner*—Eugene H. Eickholt
*Attorney, Agent, or Firm*—Fay, Sharpe, Beall, Fagan, Minnich & McKee

[57] ABSTRACT

Stacks of sets of number identified Bingo tickets are produced by first stacking different main sheets containing numbered Bingo tickets arranged six by six, and (1) cutting the first stack along a medial vertical cut line, stacking the substacks and cutting the resulting stack along horizontal lines between successive ticket rows and stacking the resulting substacks; (2) cutting the first stack along a medial horizontal line, stacking the substacks and cutting the resulting stack along vertical lines between successive ticket rows and stacking the resulting substacks; or (3) cutting the first stack along a pair of parallel lines between success pairs of tickets, stacking the substacks, cutting the resulting stack along a pair of parallel lines perpendicular to the first cut lines and stacking the resulting two by two ticket substacks. The identifying numbers are so sequenced and the stacking so effective that the numbers identifying corresponding tickets in successive sets may be progressive.

21 Claims, 8 Drawing Sheets

METHOD OF PRODUCING STACKS OF TICKET STACKS

Matter enclosed in heavy brackets [ ] appears in the original patent but forms no part of this reissue specification; matter printed in italics indicates the additions made by reissue.

BACKGROUND OF THE INVENTION

The present invention relates generally to improvements in the printing and collating of tickets and it relates particularly to an improved method of producing stacks of sets of different number designated different Bingo game cards.

It is a conventional practice in the playing of Bingo to dispense or distribute to the players, in addition to the primary Bingo cards, one or more sets of a predetermined number of special Bingo cards or of tickets which differ from each other, each of the special Bingo cards being designated by an associated corresponding identifying the number so that the numbers constituting the respective Bingo game can be easily, rapidly and reliably determined whereby to facilitate the conducting of the game. The methods commonly employed in the printing and stacking of Bingo game sets possess numberous drawbacks and disadvantages. In producing the stacks of Bingo game sets of different arrangements, for example, vertically, horizontally or quadrilaterally arranged sets of games, the conventional practices require different large numbers of printing plates and a separate machine for each arrangement. This procedure is expensive, highly time and labor consuming, requires large amounts of equipment, is of little versibility and adaptability and otherwise leaves much to be desired.

SUMMARY OF THE INVENTION

It is a principal object of the present invention to provide an improved method for the production and collation of printed material.

Another object of the present invention is to provide an improved method for producing stacked sets of printed tickets.

Still another object of the present invention is to provide an improved method of producing stacked sets of different Bingo tickets in which each of the Bingo tickets is separately individually designated by a respective identifying number to facilitate the determination of the contents thereof.

A further object of the present invention is to provide an improved method of the above nature characterized by its efficiency, low labor consumption, minimization of equipment requirements and great versitility and adaptability.

The above and other objects of the present invention will become apparant from a reading of the following description taken in conjunction with the accompanying drawings which illustrate preferred embodiments thereof.

A method of producing a stack of different ticket stacks according to the present invention includes the steps of printing and stacking a plurality of first sheets containing different tickets arranged in similar patterns of mutually perpendicular rows and columns each having a factorable number of tickets to form a first stack, cutting the first stack along one or more parallel first cut lines to produce similar first substacks, stacking the first substacks to form a second stack, cutting the second stack along one or more parallel second cut lines perpendicular to the first cut lines to produce second substacks of different ticket sets and stacking the second substacks to produce a third stack of mutually different ticket sets.

Advantageously each of the first sheets contains six laterally spaced vertical rows of six tickets, each ticket being a Bingo card or ticket and being designated by a respective different identifying number. The stacked sheets may be cut in various manners to produce the desired ticket stacks. The first stack may be cut along its medial vertical axis the resulting substacks stacked and cut along horizontal lines between successive groups of tickets and the resulting substacks stacked; or the first stack may be cut along its medial horizontal axis, the resulting substacks stacked and cut along vertical lines between successive groups of tickets and the resulting ticket set substacks stacked; or the first stack may be cut along a first pair of parallel lines between successive pairs of tickets, the resulting substacks stacked and cut along a pair of parallel lines perpendicular to the first pair and between successive pairs of tickets to produce substacks of square sets of four tickets each of which are then stacked. While main sheets containing six by six games are described main sheets containing other numbers of rows and columns, such as eight-by-eight may be used.

With the method of the present invention stacks of ticket sets of many different arrangements and numbers of tickets may be produced with a minimum of equipment, at great efficiency and at low labor costs and expense and with great versitility and adaptability.

DESCRIPTION OF THE PREFERRED EMBODIMENTS

Figure 1:
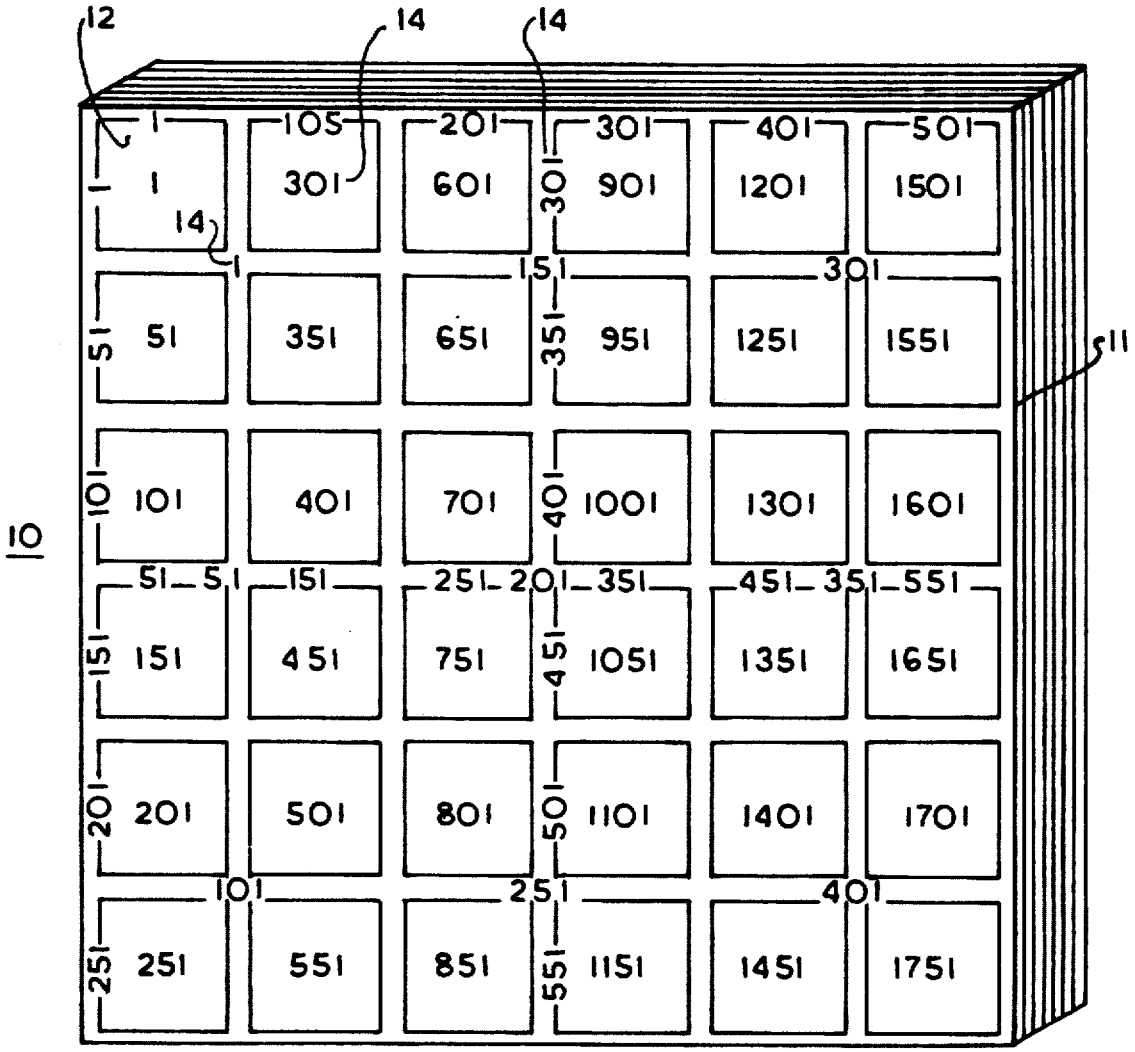
FIG. 1 is a top perspective view of a stack of sheets containing Bingo tickets in accordance with a step of a preferred embodiment of the present invention.
Figure 2:
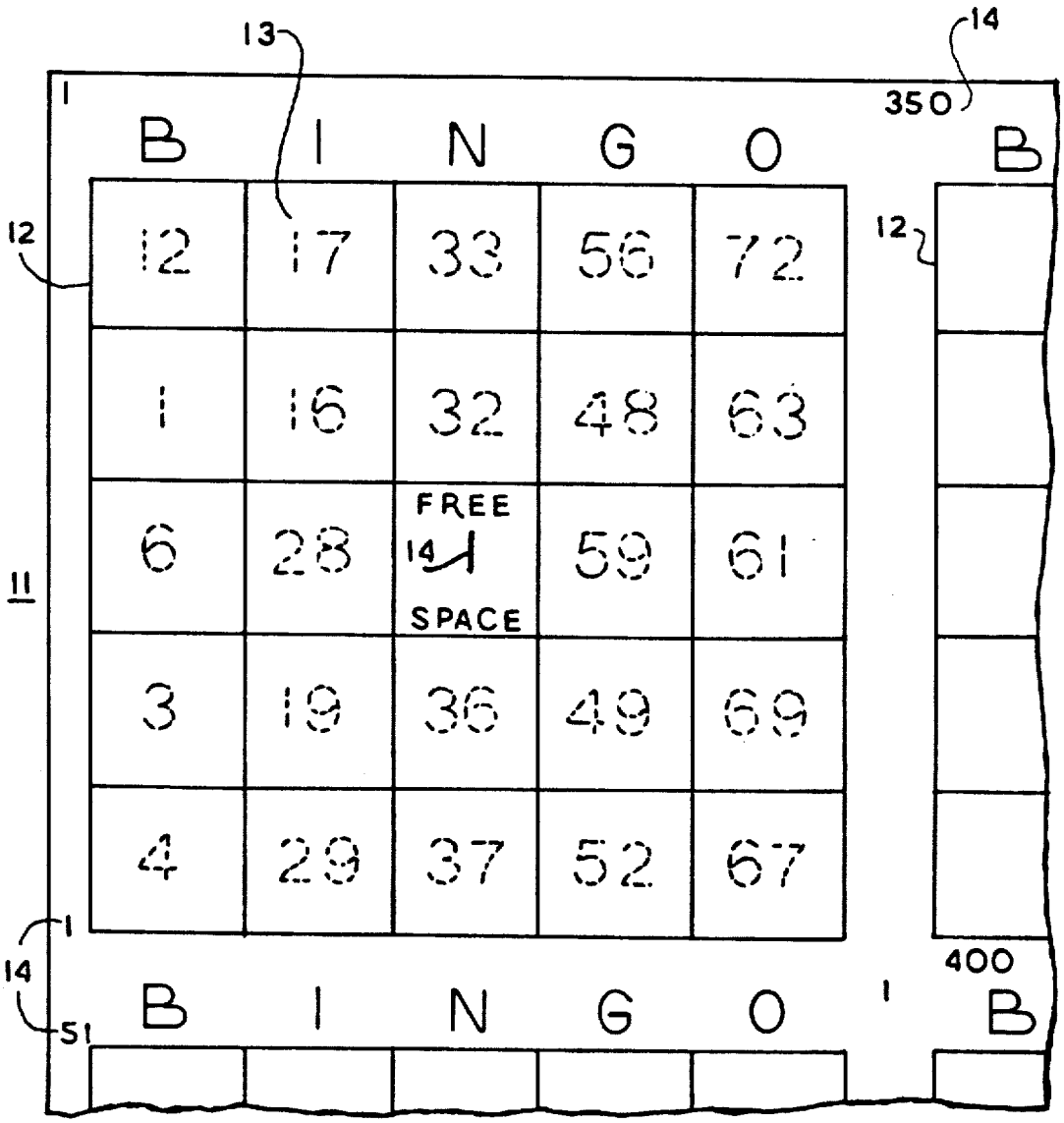
FIG. 2 is a fragmentary top plan view of one of the sheets.
Figure 3:
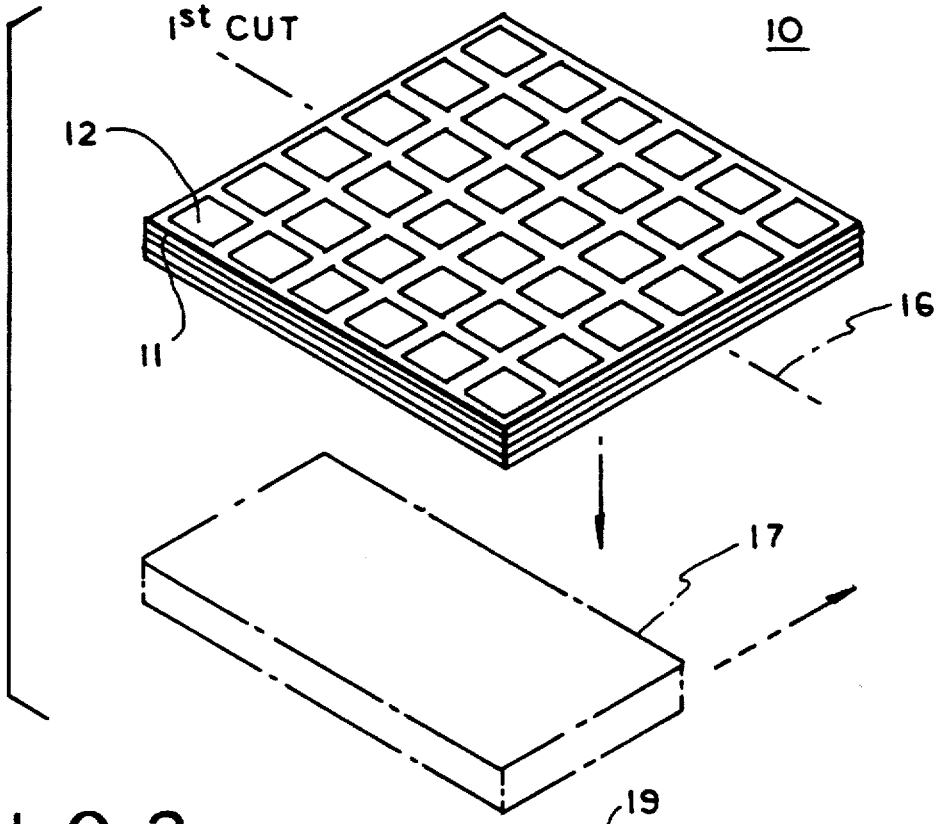
FIG. 3 is a perspective view of the second step of the method.
Figure 4:
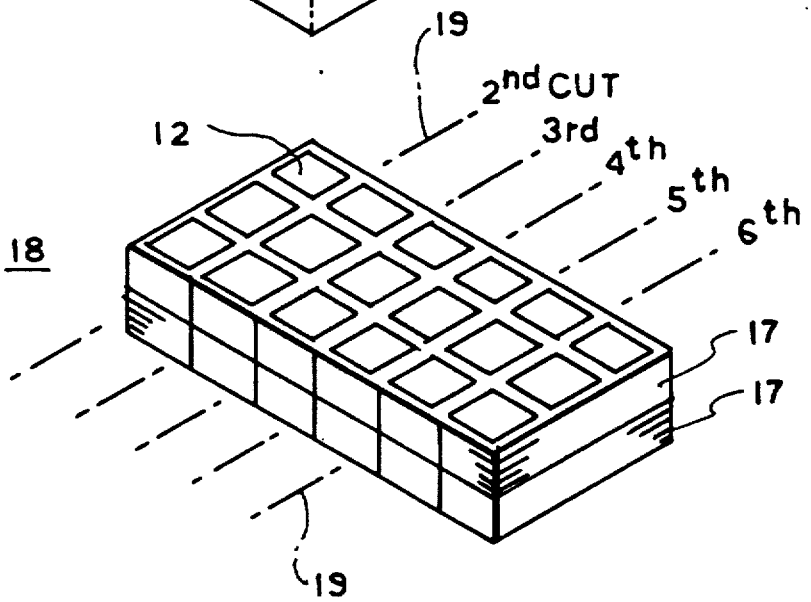
FIG. 4 is a perspective view of the second stack consequent to the step shown in FIG. 3
Figure 5:
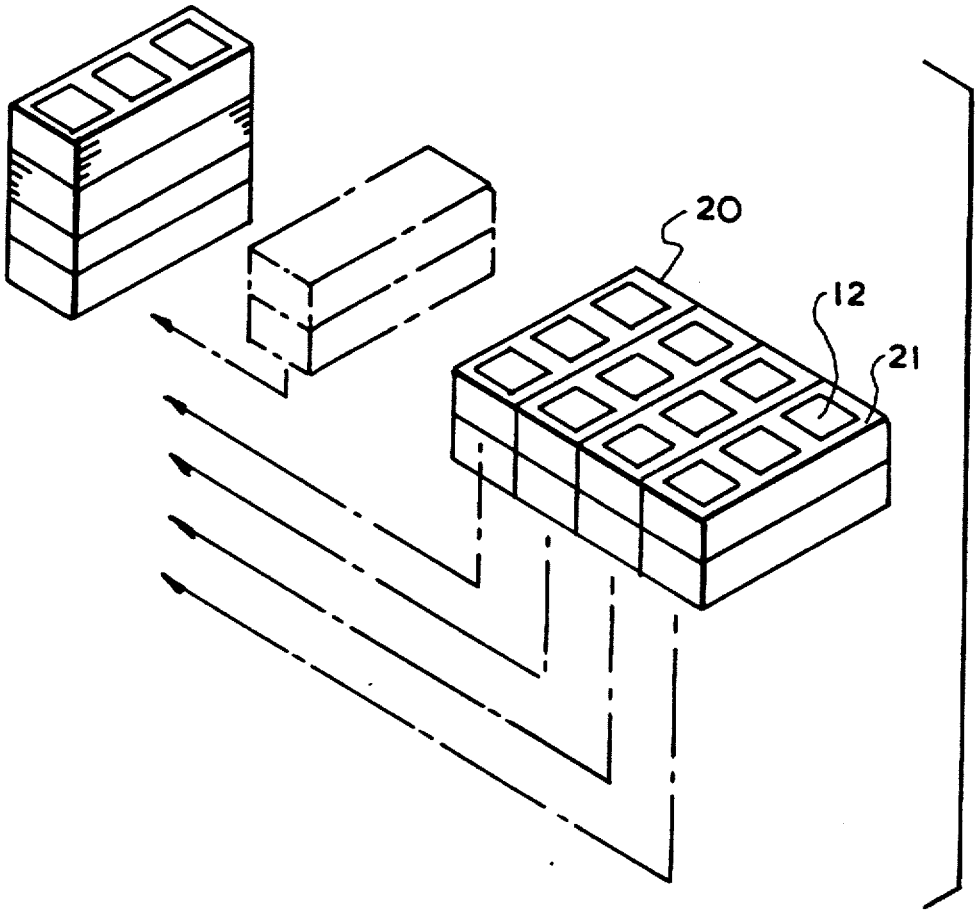
FIG. 5 is a perspective view of the third step of the method.
Figure 6:
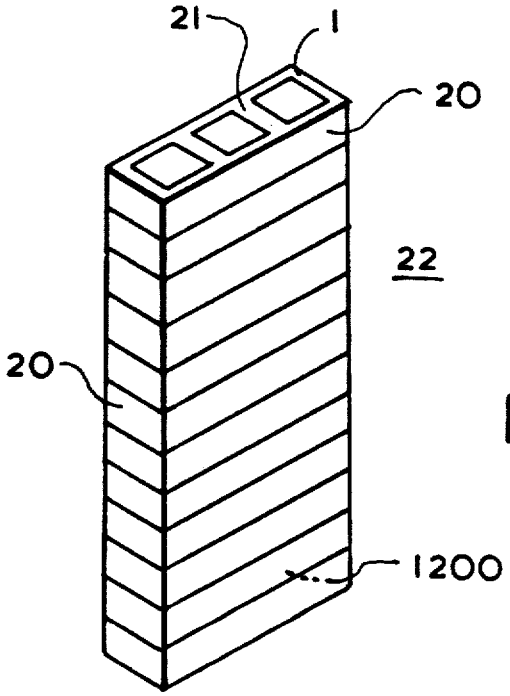
FIG. 6 is a perspective view of the final stack consequent to the step shown in FIG. 4.

Referring now to the drawings, particularly FIGS. 1 to 6 thereof which illustrate the sequential steps in accordance with a preferred embodiment of the present invention, the reference numeral 10 generally designates a main or first stack of printed first paper sheets 11. Each of the sheets 11 are of square configuration and contain an array of Bingo cards or tickets 12 which are different from each other and from those of the other sheets 11. Each ticket 12 is of conventional square shape and is subdivided into twenty five squares, each of which except for the center square contains a play number 13 in the usual manner. Associated with each ticket 12 is a respective different pair of the same identifying number 14 which is printed in the center square of each ticket 12 as well as proximate a corner thereof.

Each sheet 11 has printed thereon thirty six tickets 12 arranged in mutually perpendicular rows and columns of six tickets 12 each. The tickets in each sheet 11 are different from each other and differ from these of the other sheets in the stack 10. The identifying numbers 14 on each sheet are progressively higher by an increment equal to the numbers of sheets 11 in stack 10, for example by an increment of fifty in the illustrated embodiment, the progress being in a matrix sequence from the upper left corner downwardly to the bottom and then from next successive top tickets downwardly. It should be noted that the number of tickets 12 in each column and row is six, a factorable number divisable by two and three as well as by six and one. The successive sheets 11 are printed and stacked into stack 10 in any suitable manner and with conventional or known equipment, for example, as described in U.S. Pat. No. 3,822,876 issued Jul. 9, 1974.

The main stack 10 is cut at a first cut line along the vertical medial axis 16 of stack 10 to divide stack 10 into a pair of similar substacks 17 each containing eighteen tickets 12 arranged in six vertically spaced rows of three side-by-side tickets. The two resulting substacks are mutually superimposed to produce a second stack 18 of twice the thickness of stack 10 and the stack 18 is then cut by five vertically spaced horizontal cut lines 19 intermediate successive rows of tickets 12 to produce six substacks 20 of sets of three horizontal side-by-side tickets 12. In the illustrated embodiment the left hand substack 17 is transferred to underlie the right-hand substack 17 and the substacks 20 are transferred so that the lower substacks 20 underlie the next successive upper substacks 20. Groups of any desired number of ticket sets may be separably bound, if desired, for example in the manner described in U.S. Pat. No. 3,822,876. It should be noted that the identifying numbers 14 in the final stack 22 may be of any desired sequence, progressive or otherwise, by the corresponding arrangement of the identifying numbers in each sheet 10 and by the manner in which the sheets 11 and substacks 17 and 20 are stacked or arranged.

Figure 7:
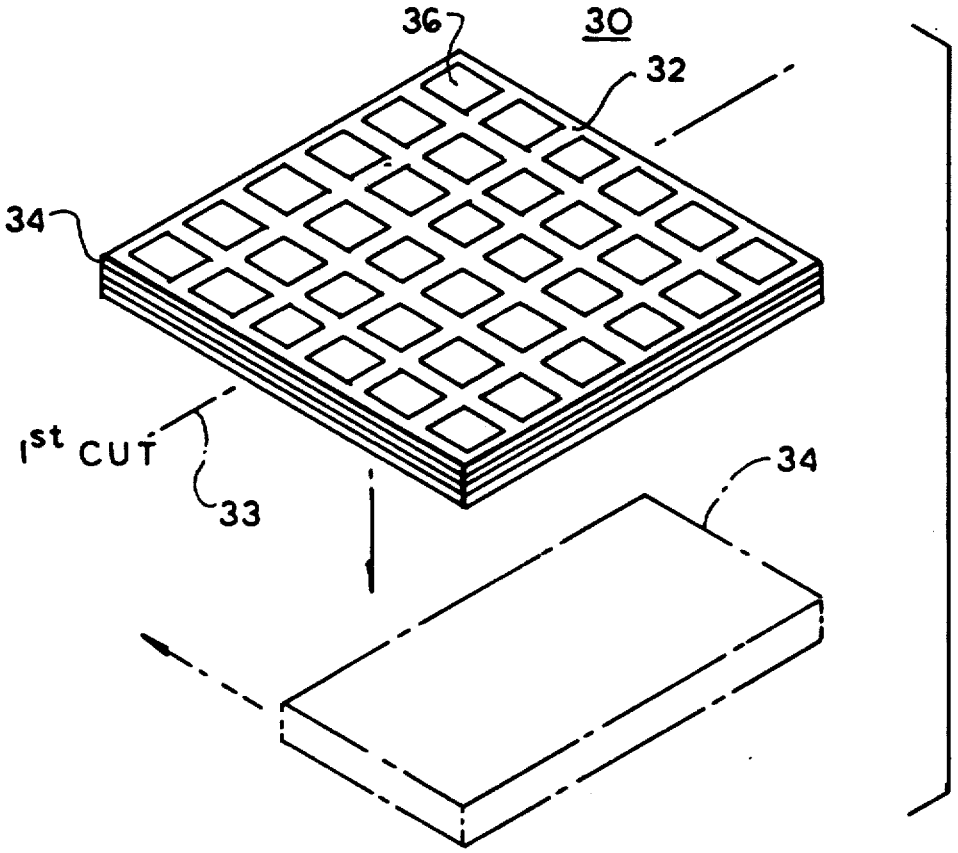
FIGS. 7 to 10 are views similar to FIGS. 3 to 6 respectively of another embodiment of the present invention.
Figure 8:
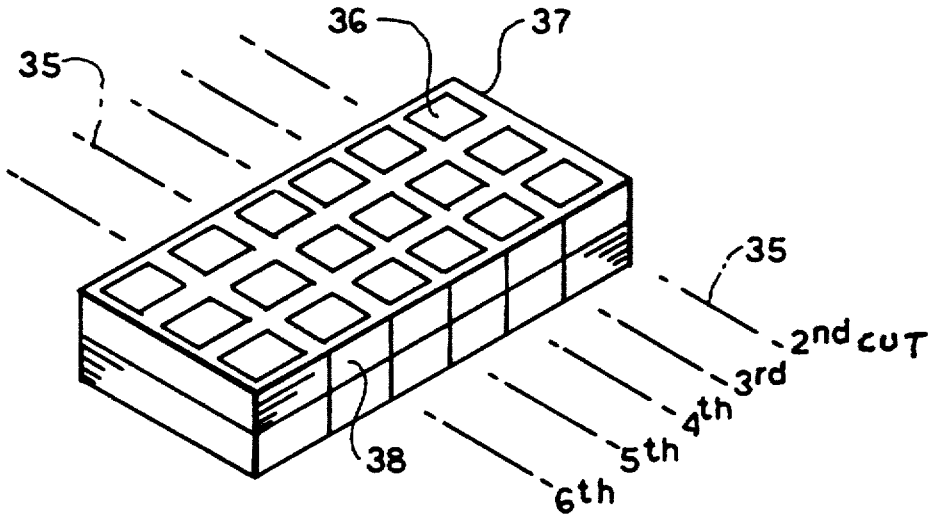
Figure 9:
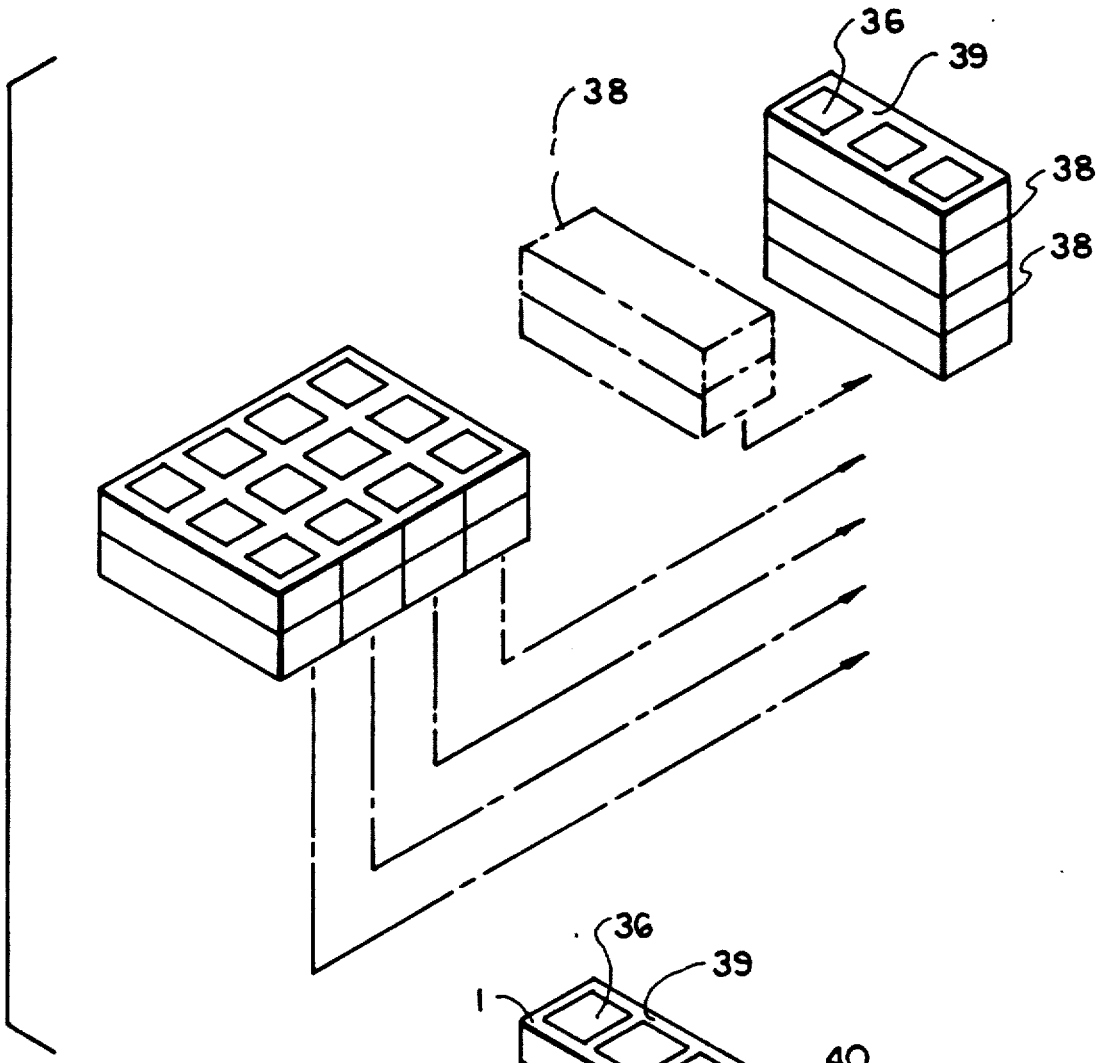
Figure 10:
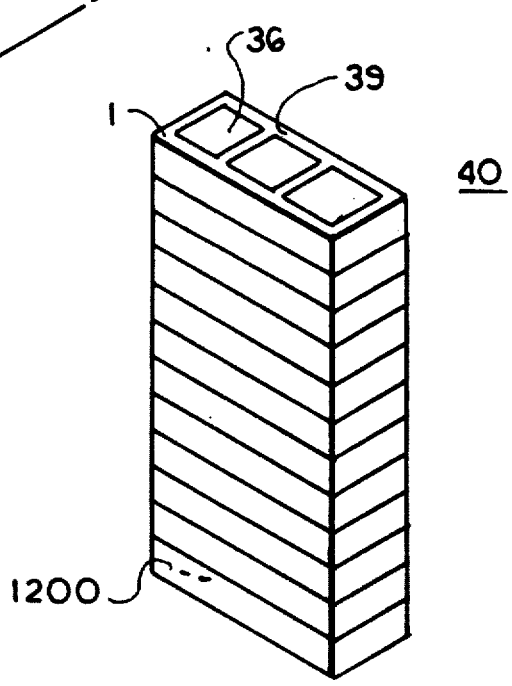

In FIGS. 7 to 10 of the drawings there is shown a sequence of steps in which a stack of sets of tickets is produced in which each set contains three vertically spaced tickets instead of the side-by-side tickets in sets 21 of stack 22 described above. A main stack 30 of sheets 32 is produced as eariler described in which stack 30 and sheets 32 are similar to stack 10 and sheets 11, the sheets 32 being each provided with thirty six different tickets and respective identifying numbers. The stack 30 is cut along a first cut line 33 along the medial horizontal axis of stack 30 to produce two similar rectangular substacks 34, each containing three vertically spaced rows of six tickets 36 each. The upper substack 34 is superimposed on the lower substack 34 to form a second stack 37 which is then cut along vertical second cut lines 35 between each pair of columns of tickets 36 to produce substacks 38 of final rectangular sheets 39 each having a vertical column of three tickets 36. The substacks 38 are successively stacked to form the final stack 40 of sheets 39, each containing a column of three tickets 36. Although the substacks 38 are illustrated as being successively brought into underlying relationship with the rightmost substack to form stack 40 other sequences may be employed depending on the arrangements of the ticket identifying numbers and the desired sequence. Groups of sheets 39 may be separably bound as eariler described.

Figure 11:
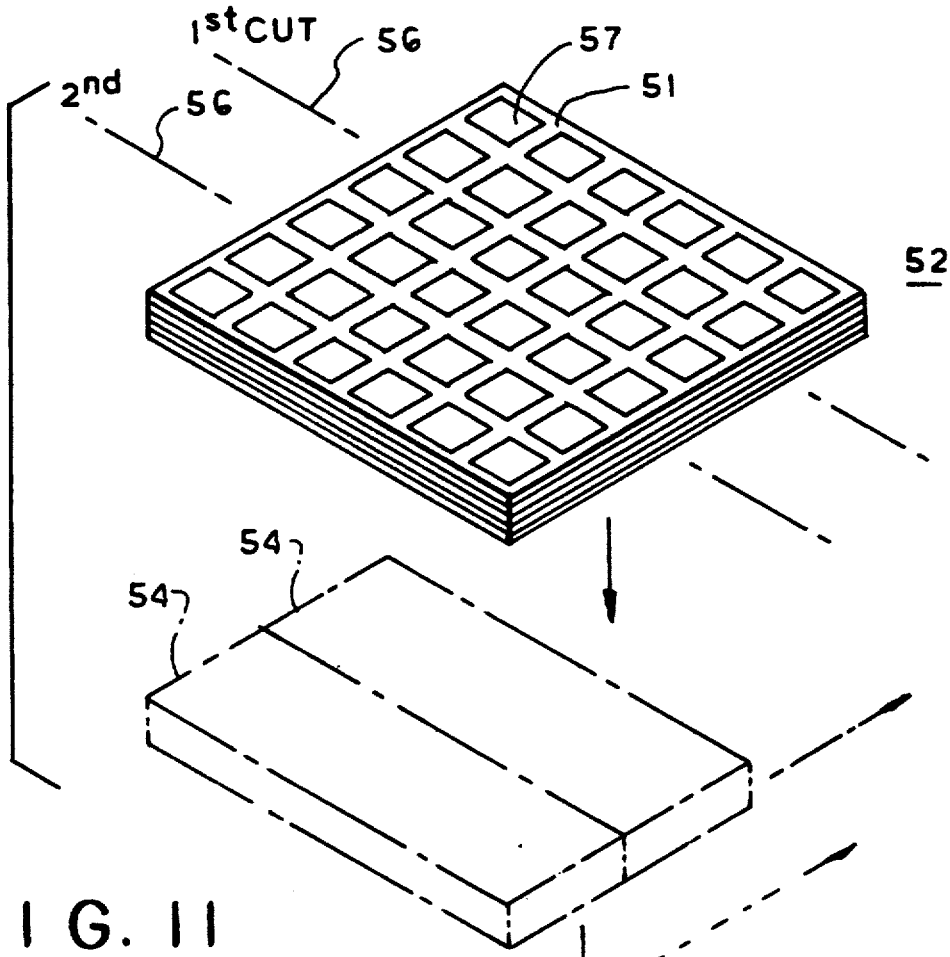
FIGS. 11 to 14 are views similar to FIGS. 3 to 6 respectively of still another embodiment of the present invention.
Figure 12:
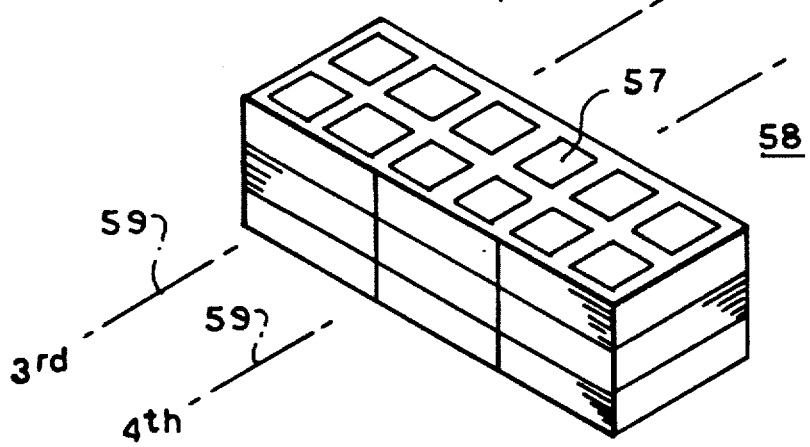
Figure 13:
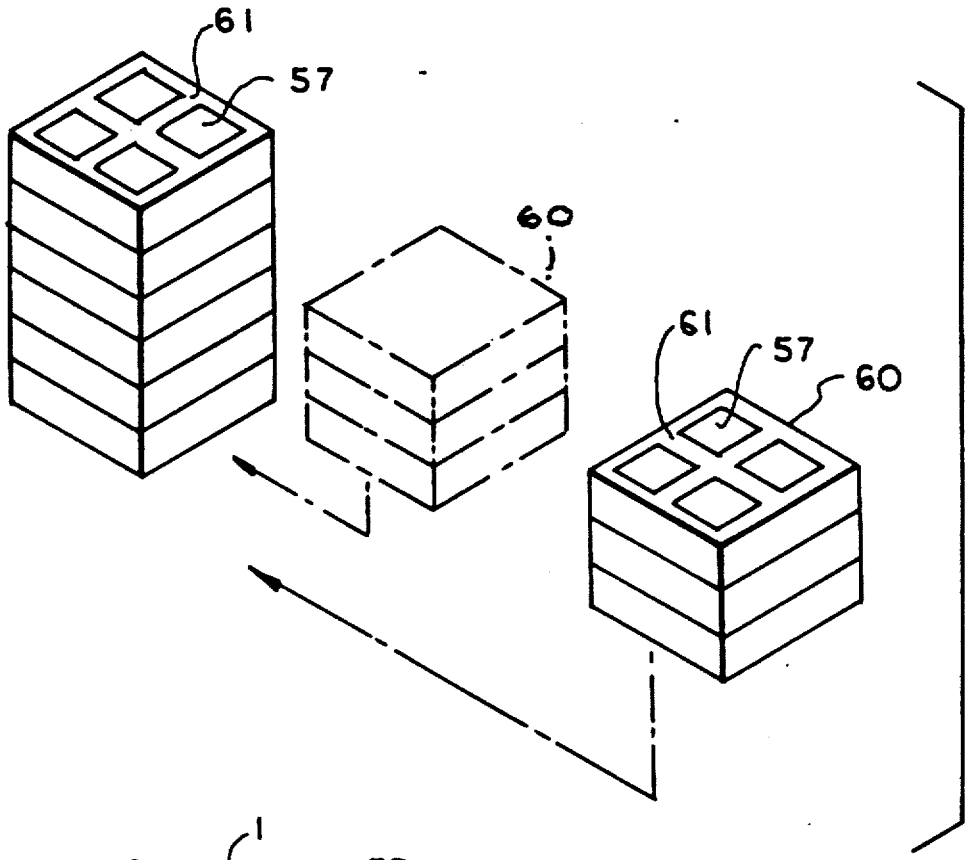
Figure 14:
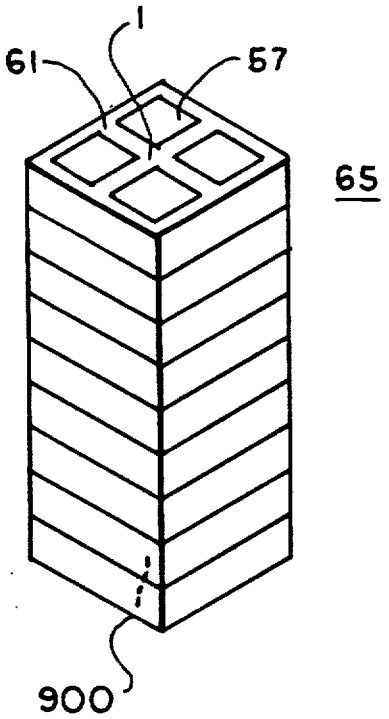

The procedure illustrated in FIGS. 11 to 14 of the drawings differs from the eariler procedures in that each of the sets of tickets in the final sheets consists of four instead of three tickets and the tickets are arranged in each sheet in a pair of vertically spaced rows of two side-by-side tickets.

The sheets 51 forming the first or main stack 52 are similar in shape and contents to those eariler described and are produced in a like manner. Stack 52 is cut into first substacks 54 by a pair of symmetrical vertical cut lines 56 between successive vertical columns of tickets 57, each substack 54 being two tickets wide by six tickets long and substacks 54 are stacked into a stack 58 by stacking the right hand substacks successively upon next successive left hand substacks.

The resulting stack 58 is then cut by a symmetrical pair of horizontal or transverse cut lines 59 between successive pairs of vertically spaced rows of tickets 57 to produce substacks 60 of square sheets 61 each of which contains four tickets 57 arranged two by two. The substacks 60 are then stacked to produce the final stack 65 of sheets 61 by stacking the uppermost substacks 60 over the next successive lower stacks. As in the eariler described prodcedures, groups of the sheets 61 may be separably bound and the ticket identifying numbers so progress and are so positioned and the sequence of stacking the substacks so relates that the identifying numbers of tickets in successive sheets for example the upper left corner tickets, are in progressive sequence.

While there have been described and illustrated preferred embodiments of the present invention it is apparent that numberous alterations, omissions and additions may be made without departing from the spirit thereof. Thus, for example, while in the preferred procedures sets of three tickets, vertical or horzontal or sets of four tickets are produced, sets of other other numbers of tickets and other of other arrangements may be produced from the same main sheets and the main sheets may contain other than six vertically spaced rows of six tickets. Moreover, the ticket identifying numbers may located in any suitable or desired positions relative to the respective tickets or games.

I claim:

[1. The method of producing a stack of ticket sets each of which contains a plurality of different tickets comprising the steps of printing and stacking a plurality of rectangular first sheets containing different tickets arranged in similar patterns of mutually perpendicular rows and columns each having a factorable number of tickets to form a first stack, cutting said first stack along one or a plurality of parallel first cut lines to produce similar first substacks, stacking said first substacks to form a second stack, cutting said second stack along one or a plurality of parallel second cut lines perpendicular to said first cut lines to produce second substacks of different ticket sets and stacking said second substacks to produce a third stack of said ticket sets, said ticket sets being mutually different.]

[2. The method of claim 1 wherein each of said rows and columns contain six of said tickets.]

3. [The method of claim 2] *A method of producing a stack of ticket sets each of which contains a plurality of different tickets comprising the steps of:*

*printing and stacking a plurality of rectangular first sheets containing different tickets arranged in similar patterns of mutually perpendicular rows and columns each having a factorable number of tickets to form a first stack, wherein each of said rows and columns contain six of said tickets,* wherein said printing step includes the printing on said sheets *of a* different identifying number designating respective tickets,

*cutting said first stack along one or a plurality of parallel first cut lines to produce similar first substacks,*

*stacking said first substacks to form a second stack,*

*cutting said second stack along one or a plurality of parallel second cut lines perpendicular to said first cut lines to produce second substacks of different ticket sets, and*

*stacking said second substacks to produce a third stack of said ticket sets, wherein each sheet of said third stack includes at least two tickets, said ticket sets being mutually different, wherein said identifying numbers are progressively higher on successively lower sheets of said third stack.*

4. The method of claim 3 wherein said identifying numbers are progressively higher in successively lower sheets of said first stack.

5. The method of claim 3 or 4 wherein said tickets comprise Bingo games.

6. The method of [claim 3] *producing a stack of ticket sets each of which contains a plurality of different tickets comprising the steps of printing and stacking a plurality of rectangular first sheets containing different tickets arranged in similar patterns of mutually perpendicular rows and columns each having a factorable number of tickets to form a first stack, cutting said first stack along one or a plurality of parallel first cut lines to produce similar first substacks, stacking said first substacks to form a second stack, cutting said second stack along one or a plurality of parallel second cut lines perpendicular to said first cut lines to produce second substacks of different ticket sets and stacking said second substacks to produce a third stack of said ticket sets, said ticket sets being mutually different wherein each of said rows and columns contain six of said tickets wherein said printing step includes the printing on said sheets different identifying number designating respective tickets* wherein said first cut line is along the vertical medial axis of said first stack to form two first substacks of sheets three tickets wide and six tickets long and said second cut lines are between successive rows of tickets to produce second substacks of sheets of three side by side tickets.

7. The method of [claim 3] *producing a stack of ticket sets each of which contains a plurality of different tickets comprising the steps of printing and stacking a plurality of rectangular first sheets containing different tickets arranged in similar patterns of mutually perpendicular rows and columns each having a factorable number of tickets to form a first stack, cutting said first stack along one or a plurality of parallel first cut lines to produce similar first substacks, stacking said first substacks to form a second stack, cutting said second stack along one or a plurality of parallel second cut lines perpendicular to said first cut lines to produce second substacks of different ticket sets and stacking said second substacks to produce a third stack of said ticket sets, said ticket sets being mutually different wherein each of said rows and columns contain six of said tickets wherein said printing step includes the printing on said sheets different identifying number designating respective tickets* wherein said first cut line is along the horizontal medial axis of said first stack to form two first substacks of sheets six tickets wide and three tickets long and said second cut lines are between successive columns of tickets to produce second substacks of sheets of three vertically spaced end to end tickets.

8. The method of [claim 3] *producing a stack of ticket sets each of which contains a plurality of different tickets comprising the steps of printing and stacking a plurality of rectangular first sheets containing different tickets arranged in similar patterns of mutually perpendicular rows and columns each having a factorable number of tickets to form a first stack, cutting said first stack along one or a plurality of parallel first cut lines to produce similar first substacks, stacking said first substacks to form a second stack, cutting said second stack along one or a plurality of parallel second cut lines perpendicular to said first cut lines to produce second substacks of different ticket sets and stacking said second substacks to produce a third stack of said ticket sets, said ticket sets being mutually different wherein each of said rows and columns contain six of said tickets wherein said printing step includes the printing on said sheets different identifying number designating respective tickets* wherein said first cut lines are two in number between respective successive pairs of tickets and said second cut lines are two in number between respective successive pairs of tickets to produce second substacks of sheets of four orthogonally arranged tickets.

9. The method of claim 3 wherein the values of said identifying numbers are in accordance with a square matrix with the increment between successive numbers along the matrix being equal to the number of sheets in said first stack.

*10. A method of producing a stack of ticket sets each of which contains a plurality of different tickets comprising the steps of:*

*printing and stacking a plurality of rectangular first sheets containing different tickets arranged in similar patterns of mutually perpendicular rows and columns each having a factorable number of tickets to form a first stack wherein each of said rows and columns contain six of said tickets, wherein said printing step includes the subsidiary steps of printing on said sheets a first identifying number designating a group of at least two of said tickets and printing on said sheets a different identifying number designating different tickets,*

*cutting said first stack along one or a plurality of parallel first cut lines to produce similar first substacks,*

*stacking said first substacks to form a second stack,*

*repeating said cutting and stacking steps to produce a final stack, wherein each sheet of said final stack includes at least two tickets and wherein said first identifying numbers are progressively higher on successively lower sheets of said final stack.*

*11. The method of claim 10 wherein the number of tickets in each of said rows and columns on said first sheet is a number which is factorable by 2, 3, and 6.*

*12. The method of claim 10 wherein said final stack includes sheets which each have three side by side tickets.*

*13. The method of claim 10 wherein said final stack includes sheets which each have three vertically spaced end to end tickets.*

*14. The method of claim 10 wherein said final stack includes sheets which each have four orthogonally arranged tickets.*

*15. The method of claim 10 wherein said tickets comprise Bingo games.*

*16. A method of producing a stack of ticket sets each of which contain a plurality of different tickets comprising the steps of:*

*printing and stacking a plurality of rectangular first sheets containing different tickets arranged in similar patterns of mutually perpendicular rows and columns each having a factorable number of tickets to form a first stack wherein each of said rows and columns contain six of said tickets, wherein said printing step includes the subsidiary steps of:*

*printing on said sheets a first identifying number designating each respective ticket as different, and*

*printing on each sheet a plurality of second identifying numbers,*

*cutting said first stack along one or a plurality of parallel first cut lines to produce similar first substacks,*

*stacking said first substacks to form a second stack,*

*cutting said second stack along one or a plurality of parallel second cut lines perpendicular to said first cut lines to product second substacks of different ticket sets; and,*

*stacking said second substacks to produce a third stack of ticket sets, wherein each sheet of said third stack includes at least two tickets and one of said second identifying numbers and wherein said second identifying numbers are progressively higher on successively lower sheets of said third stack.*

*17. The method of claim 16 wherein the number of tickets in each of said rows and columns on said first sheet is a number which is factorable by 2, 3 and 6.*

*18. The method of claim 16 wherein one of said second identifying numbers is provided for each three side by side tickets.*

*19. The method of claim 16 further comprising the step of printing on each sheet, before said steps of cutting and stacking, a plurality of third identifying numbers.*

*20. The method of claim 19 wherein one of said third identifying numbers is provided for each three vertically spaced end to end tickets.*

*21. The method of claim 16 further comprising the step of printing on each sheet, before said steps of cutting and stacking, a plurality of fourth identifying numbers.*

*22. The method of claim 21 wherein one of said fourth identifying numbers is provided for each four orthogonally arranged tickets.*

*23. The method of claim 16 wherein said tickets comprise Bingo games.*

* * * * *